(12) United States Patent
Dellock et al.

(10) Patent No.: US 10,857,863 B2
(45) Date of Patent: Dec. 8, 2020

(54) REMOVABLE VEHICLE ROOF PANELS WITH INTEGRATED HANDLE AND ROOF RACK ASSEMBLIES

(71) Applicant: FORD GLOBAL TECHNOLOGIES, LLC, Dearborn, MI (US)

(72) Inventors: Paul Kenneth Dellock, Northville, MI (US); Stuart C. Salter, White Lake, MI (US); James J. Surman, Clinton Township, MI (US); Harry Lobo, Canton, MI (US); Travis S. Garland, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 15/896,205

(22) Filed: Feb. 14, 2018

(65) Prior Publication Data

US 2019/0248219 A1   Aug. 15, 2019

(51) Int. Cl.
| | | |
|---|---|---|
| B60J 7/11 | (2006.01) | |
| B60R 9/042 | (2006.01) | |
| B60Q 1/24 | (2006.01) | |
| B60Q 1/26 | (2006.01) | |

(52) U.S. Cl.
CPC .............. B60J 7/11 (2013.01); B60Q 1/24 (2013.01); B60Q 1/2696 (2013.01); B60R 9/042 (2013.01)

(58) Field of Classification Search
CPC . B60Q 1/2696; B60Q 1/24; B60J 7/11; B60R 9/042

USPC ............................ 296/3, 218, 210, 224, 1.02
See application file for complete search history.

(56) References Cited

U.S. PATENT DOCUMENTS

| | | | | |
|---|---|---|---|---|
| 4,121,870 | A * | 10/1978 | Oakey | B60J 7/11 296/215 |
| 6,056,176 | A * | 5/2000 | Aftanas | B60R 9/045 224/309 |
| 6,523,888 | B1 | 2/2003 | Yan et al. | |
| 7,213,854 | B2 * | 5/2007 | Dowdey | B60J 7/11 296/218 |
| 8,770,453 | B2 | 7/2014 | Lang | |
| 8,985,414 | B2 * | 3/2015 | Aftanas | B60Q 1/2696 224/326 |
| 9,290,123 | B2 | 3/2016 | Salter et al. | |
| 9,499,094 | B1 * | 11/2016 | Dellock | B29C 45/0001 |
| 9,539,938 | B1 * | 1/2017 | Bosco | B60J 7/106 |
| 2002/0176245 | A1 * | 11/2002 | Fuwausa | B60K 35/00 362/84 |
| 2005/0173946 | A1 * | 8/2005 | Grimm | B60J 7/11 296/220.01 |
| 2006/0226188 | A1 * | 10/2006 | Smith | B60R 9/04 224/326 |

(Continued)

FOREIGN PATENT DOCUMENTS

DE   102007045780 A1   4/2009

*Primary Examiner* — Joseph D. Pape
*Assistant Examiner* — Dana D Ivey
(74) *Attorney, Agent, or Firm* — David Coppiellie; Carlson, Gaskey & Olds

(57) ABSTRACT

A vehicle includes a removable roof panel and an integrated handle and roof rack assembly mounted to the removable roof panel. The integrated handle and roof rack assembly is adapted to function both as a handle for installing or removing the roof panel and as a roof rack for achieving vehicle rooftop cargo storage.

23 Claims, 5 Drawing Sheets

(56) References Cited

U.S. PATENT DOCUMENTS

| | | | |
|---|---|---|---|
| 2008/0122236 A1* | 5/2008 | Peterson | B60Q 1/2611 296/3 |
| 2016/0052445 A1* | 2/2016 | Huang | B60Q 1/2611 362/520 |

\* cited by examiner

REMOVABLE VEHICLE ROOF PANELS WITH INTEGRATED HANDLE AND ROOF RACK ASSEMBLIES

TECHNICAL FIELD

This disclosure relates to removable vehicle roof panels that include integrated handle and roof rack assemblies that function both as handles for installing/removing the panels and as roof racks for achieving rooftop cargo storage.

BACKGROUND

Some vehicles include removable roof panels that may be unlatched and removed from the vehicle to provide vehicle passengers with an open air riding experience. These roof panels are often difficult to remove and transport. In addition, cargo typically cannot be stored on vehicle rooftops that are equipped with removable panels.

SUMMARY

A vehicle according to an exemplary aspect of the present disclosure includes, among other things, removable roof panel and an integrated handle and roof rack assembly mounted to the removable roof panel.

In a further non-limiting embodiment of the foregoing vehicle, the integrated handle and roof rack assembly includes a first length that is less than a second length of the removable roof panel.

In a further non-limiting embodiment of either of the foregoing vehicles, the integrated handle and roof rack assembly includes a handle portion and a mounting base portion.

In a further non-limiting embodiment of any of the foregoing vehicles, the handle portion includes a shaft and a leg extending transversely from the shaft, and the shaft is elevated above an exterior surface of the removable roof panel.

In a further non-limiting embodiment of any of the foregoing vehicles, the mounting base portion includes a flat surface for mounting the integrated handle and roof rack assembly to an exterior surface of the removable roof panel.

In a further non-limiting embodiment of any of the foregoing vehicles, a lighting system is configured to illuminate a portion of the integrated handle and roof rack assembly.

In a further non-limiting embodiment of any of the foregoing vehicles, the lighting system includes at least one light source and at least one image filter.

In a further non-limiting embodiment of any of the foregoing vehicles, the at least one light source is a multi-colored light emitting diode (LED).

In a further non-limiting embodiment of any of the foregoing vehicles, the lighting system includes a control system configured to command illumination of the at least one light source in response to receiving a roof panel connection signal.

In a further non-limiting embodiment of any of the foregoing vehicles, a portion of the integrated handle and roof rack assembly includes a coating adapted to passively illuminate the portion.

In a further non-limiting embodiment of any of the foregoing vehicles, the coating includes a phosphor mixture.

In a further non-limiting embodiment of any of the foregoing vehicles, the phosphor mixture includes a long persistence phosphor.

In a further non-limiting embodiment of any of the foregoing vehicles, a second removable roof panel and a second integrated handle and roof rack assembly are mounted to the second removable roof panel.

In a further non-limiting embodiment of any of the foregoing vehicles, a crossbar is connected between the integrated handle and roof rack assembly and the second integrated handle and roof rack assembly.

In a further non-limiting embodiment of any of the foregoing vehicles, a second integrated handle and roof rack assembly are mounted to the removable roof panel, and comprising a crossbar connected between the integrated handle and roof rack assembly and the second integrated handle and roof rack assembly.

A method according to another exemplary aspect of the present disclosure includes, among other things, grasping an integrated handle and roof rack assembly of a removable roof panel, installing the removable roof panel within a roof of a vehicle using the integrated handle and roof rack assembly, and connecting a crossbar to the integrated handle and roof rack assembly. The crossbar and the integrated handle and roof rack assembly establish a roof rack for storing cargo.

In a further non-limiting embodiment of the foregoing method, grasping the integrated handle and roof rack assembly includes grasping a shaft of a handle portion of the integrated handle and roof rack assembly.

In a further non-limiting embodiment of either of the foregoing methods, connecting the crossbar includes inserting the crossbar into a slot formed in a handle portion of the integrated handle and roof rack assembly.

In a further non-limiting embodiment of any of the foregoing methods, connecting the crossbar includes connecting the crossbar between the integrated handle and roof rack assembly and a second integrated handle and roof rack assembly of either the removable roof panel or a second removable roof panel.

In a further non-limiting embodiment of any of the foregoing methods, the method includes automatically illuminating a portion of the integrated handle and roof rack assembly in response to correctly installing the removable roof panel within the roof.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicles that are equipped with one or more removable roof panels. Each removable roof panel may include an integrated handle and roof rack assembly adapted to function both as a handle for installing or removing the roof panel and as a roof rack for achieving rooftop cargo storage. These and other features of this disclosure are described in greater detail below.

Figure 1:
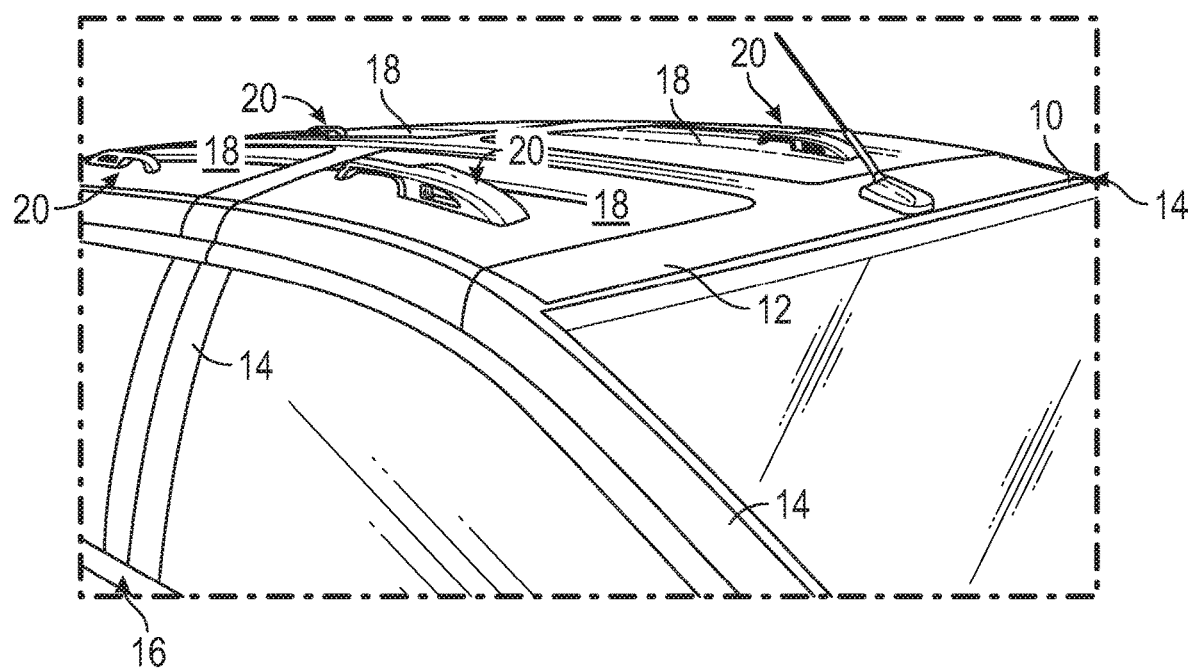
FIG. 1 illustrates a vehicle equipped with removable roof panels.

FIG. 1 illustrates select portions of a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a roof 12 supported by a plurality of pillars 14 of a vehicle body 16. The roof 12 may include one or more removable roof panels 18 that can be removed from the roof 12 to provide vehicle passengers with an open air riding experience. In the illustrated embodiment, the roof 12 includes four removable roof panels 18. The roof 12 could be configured as a T-Top roof, a Targa roof, or any other open air roof style. Thus, the total number of removable roof panels 18 provided within the roof 12 is not intended to limit this disclosure.

Each removable roof panel 18 may include one or more integrated handle and roof rack assemblies 20 that are mounted to the removable roof panels 18. The integrated handle and roof rack assembly 20 may serve multiple functions. First, the integrated handle and roof rack assembly 20 may function as a handle for installing or removing the removable roof panel 18 from the roof 12. The integrated handle and roof rack assembly 20 may be grasped by a user to aid in maneuvering the removable roof panel 18 during its installation into or removal from the roof 12.

Figure 2:
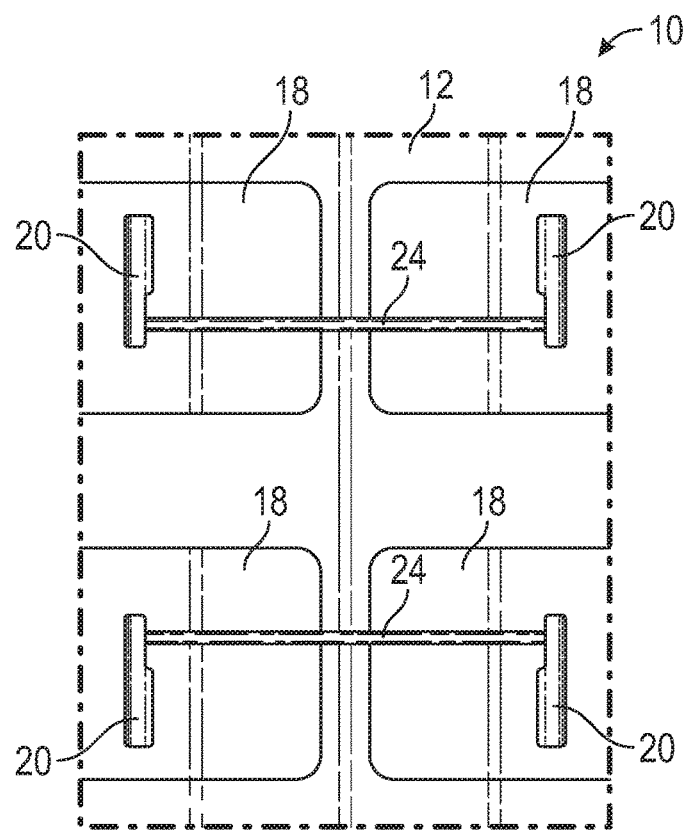
FIGS. 2 and 3 illustrate crossbars connected to removable roof panels of a vehicle.
Figure 3:
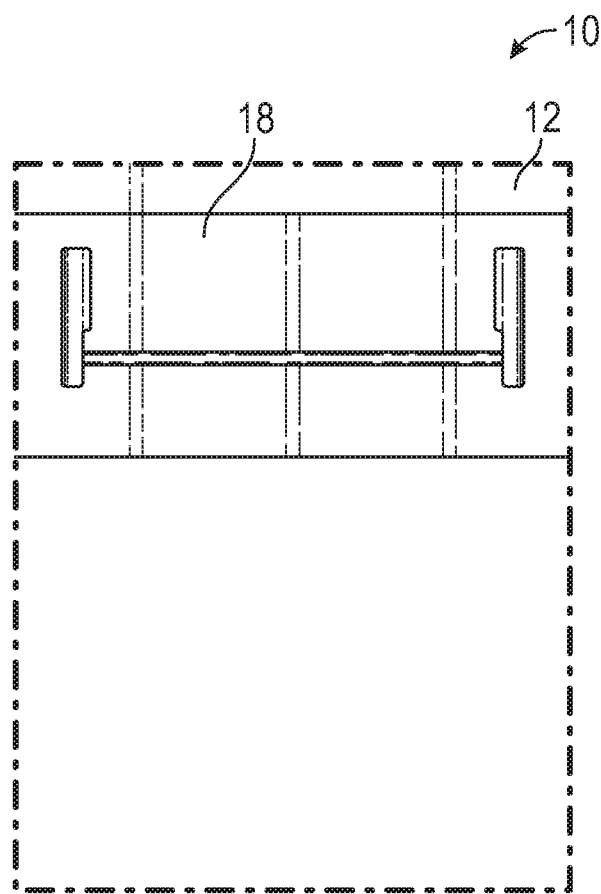

Second, the integrated handle and roof rack assembly 20 may function as a roof rack for achieving rooftop cargo storage. For example, as best shown in FIG. 2, a crossbar 24 may be connected to and may extend between the integrated handle and roof rack assemblies 20 of laterally adjacent removable roof panels 18. Alternatively, as shown in FIG. 3, the crossbar 24 may be connected to and may extend between a pair of integrated handle and roof rack assemblies 20 that are mounted to a single removable roof panel 18. The combination of the crossbars 24 and the integrated handle and roof rack assemblies 20 establish a roof rack for securing cargo atop the roof 12.

Figure 4:
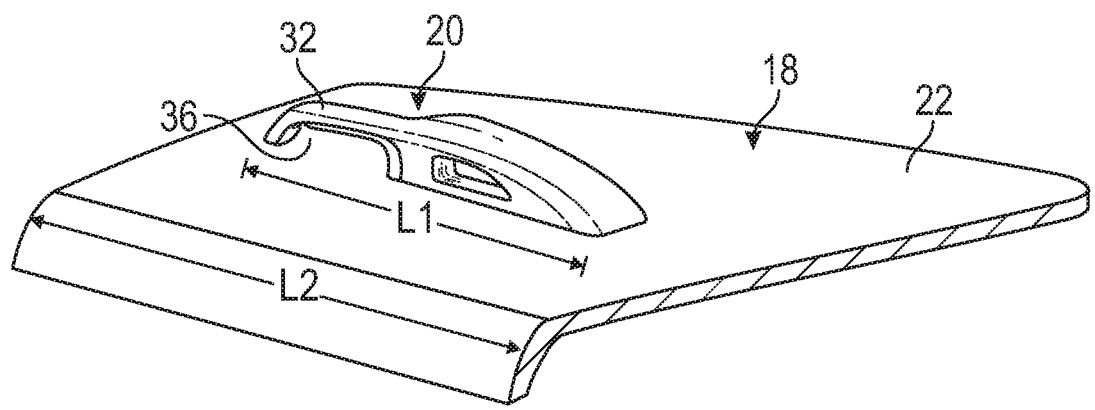
FIG. 4 illustrates a removable roof panel of FIG. 1 after it has been removed from the vehicle.

Referring now primarily to FIG. 4, the integrated handle and roof rack assembly 20 may be mounted to an exterior surface 22 of the removable roof panel 18. In an embodiment, the integrated handle and roof rack assembly 20 is mounted near a center of the removable roof panel 18. However, the integrated handle and roof rack assembly 20 could be mounted at other locations of the removable roof panel 18 as necessary for achieving useful assistance in removing or installing the removable roof panel 18.

In an embodiment, the integrated handle and roof rack assembly 20 includes a first length L1 (measured in the longitudinal direction of the vehicle 10) that is less than a second length L2 of the removable roof panel 18. Thus, the integrated handle and roof rack assembly 20 extends across only a relatively small portion of the total length of the roof 12 of the vehicle 10.

Figure 5:
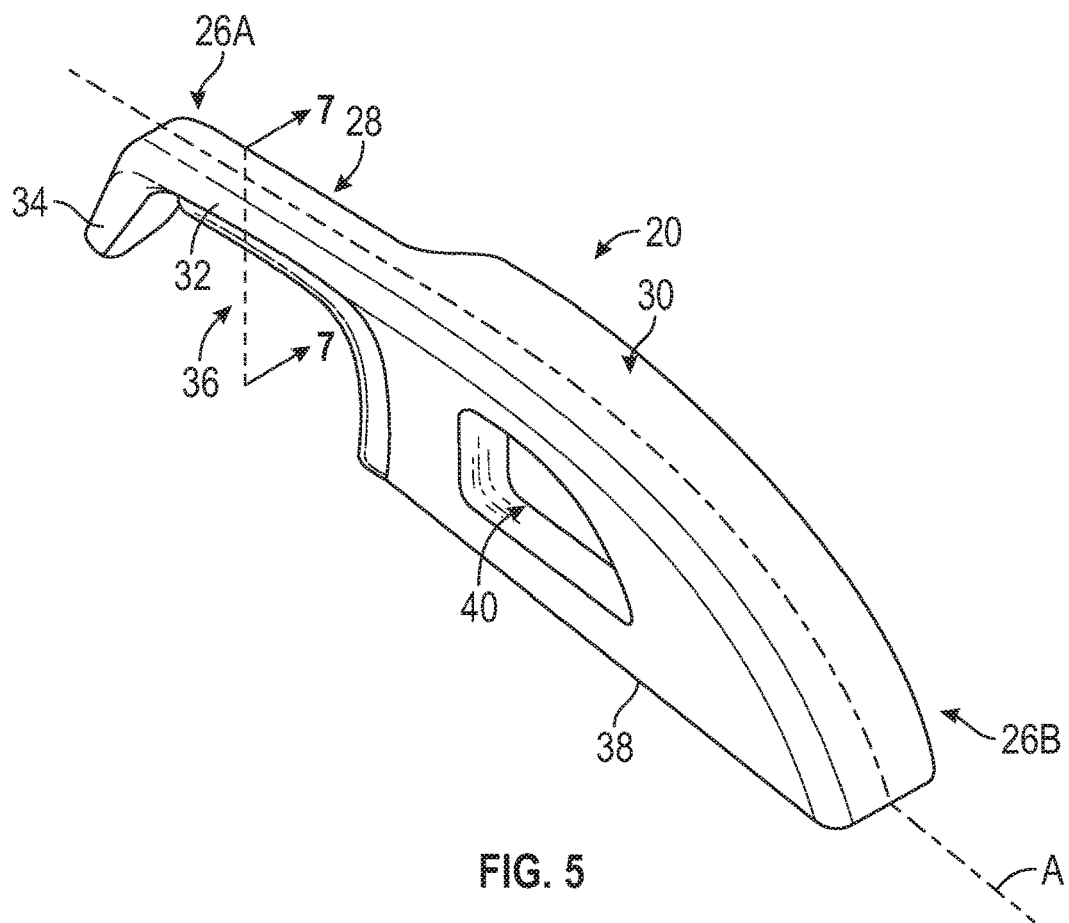
FIGS. 5 and 6 illustrate an integrated handle and roof rack assembly of the removable roof panel of FIG. 4.

FIG. 5 is a perspective view of an exemplary integrated handle and roof rack assembly 20. The integrated handle and roof rack assembly 20 extends along a longitudinal axis A between opposing ends 26A, 26B. The longitudinal axis A is generally parallel to the longitudinal axis of the vehicle 10 shown in FIG. 1. A handle portion 28 is disposed at the end 26A, and a mounting base portion 30 is disposed at the opposite end 26B.

The handle portion 28 may include a shaft 32 and a leg 34 that extends transversely from the shaft 32. The shaft 32 is elevated above the exterior surface 22 of the removable roof panel 18 (see FIG. 4) to establish a clearance opening 36 for allowing a user to grip the shaft 32 when removing or installing the removable roof panel 18. The leg 34 may contact the exterior surface 22 of the removable roof panel 18 to provide an additional mounting point or could terminate short of the exterior surface 22 such that a gap extends between the leg 34 and the exterior surface 22.

The mounting base portion 30 of the integrated handle and roof rack assembly 20 generally provides a flat surface 38 for mounting the integrated handle and roof rack assembly 20 to the removable roof panel 18. In an embodiment, the mounting base portion 30 includes one or more openings 40. The openings 40 may be used as additional gripping points when removing or installing the removable roof panel 18 and/or may serve as a styling feature of the integrated handle and roof rack assembly 20.

Figure 6:
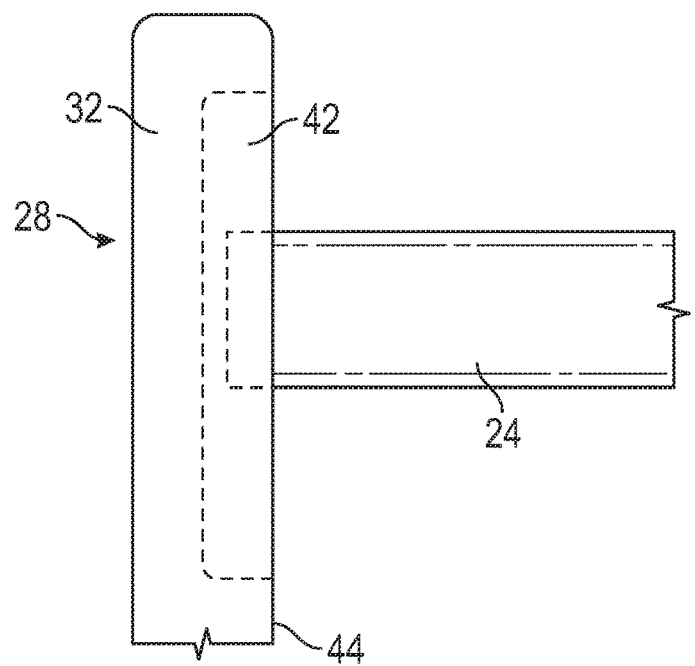

Referring to FIG. 6, the shaft 32 of the handle portion 28 of the integrated handle and roof rack assembly 20 may include a slot 42. The slot 42 may be formed in a side wall 44 of the shaft 32. The slot 42 establishes a connection point for connecting a crossbar 24 to the integrated handle and roof rack assembly 20. Together, the integrated handle and roof rack assembly 20 and the crossbar 24 establish a roof rack for securing cargo atop the roof 12.

Figure 7:
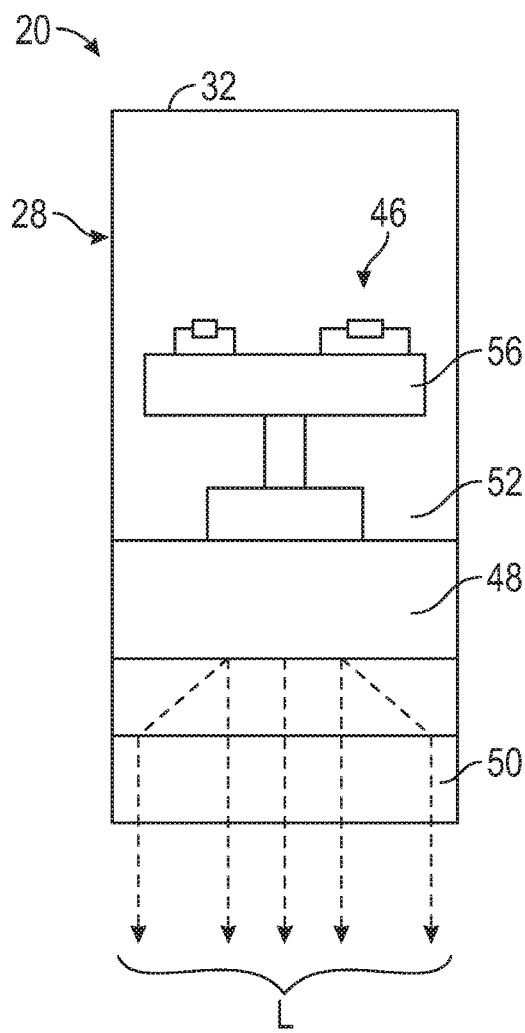
FIG. 7 is a cross-sectional view through section 7-7 of FIG. 5.

FIG. 7 is a cross-sectional view through section 7-7 of FIG. 5 and illustrates an exemplary lighting system 46 that may be incorporated into the integrated handle and roof rack assembly 20 for providing aesthetically pleasing lighting effects. In the illustrated embodiment, the lighting system 46 is housed inside the shaft 32 of the handle portion 28 of the integrated handle and roof rack assembly 20. However, similar lighting systems could be provided to illuminate the openings 40 of the mounting base portion 30.

In an embodiment, the lighting system 46 includes one or more light sources 48 and one or more image filters 50. The total number of light sources 48 and image filters 50 may vary depending on the type and amount of illumination that is desired, among other factors.

The shaft 32 encloses and/or supports the light source 48 and the image filter 50. In an embodiment, the shaft 32 is sized and shaped to provide an aerodynamic and aesthetically pleasing design within the integrated handle and roof rack assembly 20. However, the size and shape of the shaft 32 are not intended to limit this disclosure. The shaft 32 may be made of polymeric materials, metallic materials, or a combination of such materials.

Although a single light source 48 is depicted in FIG. 7, it should be understood that the lighting system 46 could include a multitude of light sources. The light source 48 may be an incandescent bulb, a halogen bulb, or a light emitting diode (LED). Other light sources could also be utilized within the scope of this disclosure. In an embodiment, the light source 48 is a multi-colored LED, such as a Red, Green, Blue (RGB) LED, for example.

The light source 48 may be positioned within a cavity 52 of the shaft 32 and is configured to emit and direct light through the image filter 50. The light source 48 may be powered by a vehicle power supply system and may be controlled by a vehicle lighting control module 54 (see FIG. 8), for example.

The image filter 50 is arranged within the light output window of the light source 48 such that light L that is outputted by the light source 48 is illuminated onto and passes through the image filter 50 to project light outwardly from the shaft 32. In an embodiment, the image filter 50 includes a light transparent film having either a positive or negative light transparent image.

The lighting system 46 may additionally include a printed circuit board (PCB) 56. The PCB 56 includes control circuitry including LED drive circuitry for controlling activation and deactivation of the light source 48.

Figure 8:
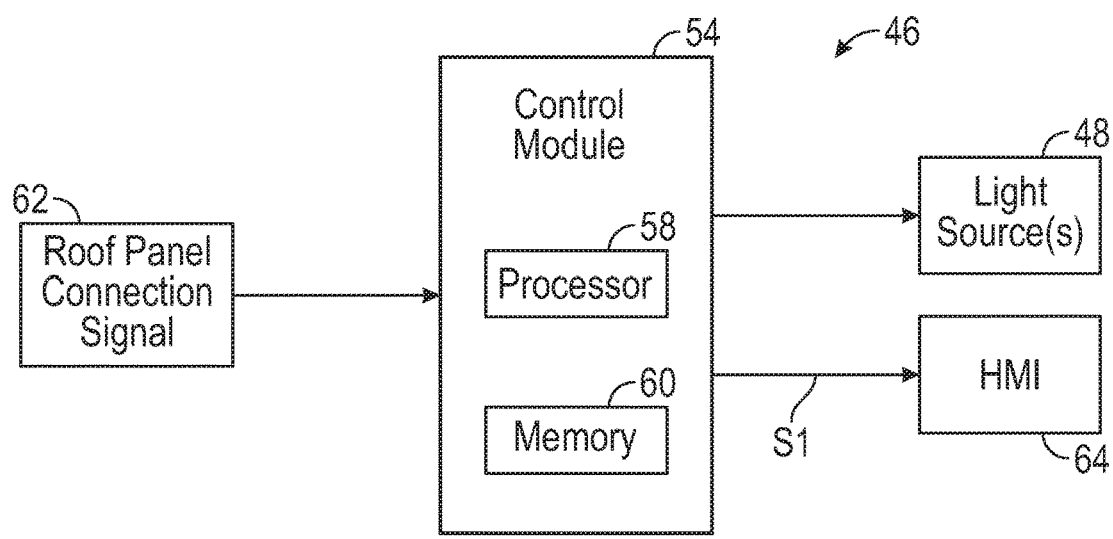
FIG. 8 is a block diagram of a lighting system of the integrated handle and roof rack assembly of FIGS. 5-7.

Referring to FIG. 8, the lighting system 46 is further illustrated as including a control module 54 for controlling each light source 48, such as by applying signals to the light sources 48. The control module 54 may be an integral component of the PCB 56 or could be a separate component from the PCB 56. In an embodiment, the control module 54 includes a processing unit 58 and non-transitory memory 60 for executing the various control strategies of the lighting system 46.

The control module 54 may receive and process various inputs to control the light source(s) 48 in a desired manner for illuminating the integrated handle and roof rack assembly 20. A first input to the control module 54 may include a roof panel connection signal 62. The roof panel connection signal 62 may be a signal received from another control module, such as a body control module (BCM), indicating that the removable roof panel 18 has been properly positioned and locked into place within the roof 12. In an embodiment, the removable roof panel 18 may include power and ground connections that generate low level continuity current signals when properly connected to corresponding connections mounted within the roof 12. In another embodiment, the lighting system 46 is configured to automatically respond to a roll call message when a proper power and ground connection has been made. Proper connection of the removable roof panel 18 could be confirmed using any communication technique.

The processing unit 58, in an embodiment, is configured to execute one or more programs stored in the memory 60 of the control module 54. A first exemplary program, when executed, may determine when and how to illuminate (or, optionally, not to illuminate) the light sources 48 of the integrated handle and roof rack assembly 20. A second exemplary program, when executed, may automatically communicate a control signal S1 to a human machine interface (HMI) 64 located within a passenger cabin of the vehicle 10 for displaying a message to the user that the removable roof panel 18 has been properly installed within the roof 12.

Figure 9:
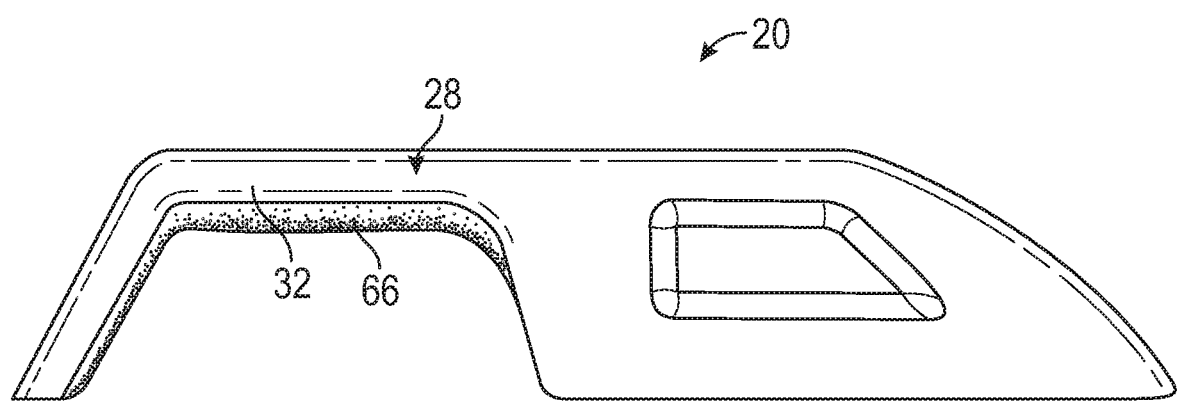
FIG. 9 illustrates another exemplary integrated handle and roof rack assembly for a removable roof panel of a vehicle.

FIGS. 7 and 8 illustrate a lighting system that is equipped to provide active illumination of the integrated handle and roof rack assembly 20. However, passive illumination of the integrated handle and roof rack assembly 20 can also be achieved. For example, as shown in FIG. 9, the handle portion 28 of the integrated handle and roof rack assembly 20 may include a coating 66 for achieving passive illumination. In an embodiment, the coating 66 includes a phosphor mixture. The coating 66 may be applied over portions of the shaft 32 to add coloring to the shaft 32. Once excited by a light source (e.g., the sun, and/or any other light source), the coating 66 may emit light that provides a glowing effect having a desired color.

The phosphor mixture of the coating 66 may include one or more phosphorescent materials. In an embodiment, the coating 66 includes long persistence phosphors that are capable of storing an activation emission and releasing light gradually, for a period of several minutes or hours, for example, once the activation emission is no longer present. Accordingly, the coating 66, when utilized within the integrate handle and roof rack assemblies 20 described herein, may continually illuminate in response to excitation by a light source. The periodic absorption of the activation emission from the excitation source may provide for a substantially sustained charge of the long persistent phosphors to provide for a consistent passive illumination.

The integrated handle and roof rack assemblies of this disclosure serve both as handles for installing or removing removable roof panels and as roof racks for achieving rooftop cargo storage. The integrated handle and roof rack assemblies may also be either actively or passively illuminated to provide enhanced styling appearances in dark ambient conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a removable roof panel;
an integrated handle and roof rack assembly mounted to the removable roof panel;
a second removable roof panel;
a second integrated handle and roof rack assembly mounted to the second removable roof panel; and
a crossbar connected between the integrated handle and roof rack assembly and the second integrated handle and roof rack assembly.

2. The vehicle as recited in claim 1, wherein the integrated handle and roof rack assembly includes a first length that is less than a second length of the removable roof panel.

3. The vehicle as recited in claim 1, wherein the integrated handle and roof rack assembly includes a handle portion and a mounting base portion.

4. The vehicle as recited in claim 3, wherein the handle portion includes a shaft and a leg extending transversely from the shaft, and the shaft is elevated above an exterior surface of the removable roof panel.

5. The vehicle as recited in claim 3, wherein the mounting base portion includes a flat surface for mounting the integrated handle and roof rack assembly to an exterior surface of the removable roof panel.

6. The vehicle as recited in claim 1, comprising a lighting system configured to illuminate a portion of the integrated handle and roof rack assembly.

7. The vehicle as recited in claim 6, wherein the lighting system includes at least one light source and at least one image filter, and further wherein the at least one light source is a multi-colored light emitting diode (LED).

8. The vehicle as recited in claim 7, wherein the lighting system includes a control system configured to command illumination of the at least one light source in response to receiving a roof panel connection signal.

9. The vehicle as recited in claim 6, wherein the lighting system is housed inside a shaft of a handle portion of the integrated handle and roof rack assembly.

10. The vehicle as recited in claim 1, wherein a portion of the integrated handle and roof rack assembly includes a coating adapted to passively illuminate the portion.

11. The vehicle as recited in claim 10, wherein the coating includes a phosphor mixture, and further wherein the phosphor mixture includes a long persistence phosphor.

12. The vehicle as recited in claim 1, comprising a third integrated handle and roof rack assembly mounted to the removable roof panel, and comprising a second crossbar connected between the integrated handle and roof rack assembly and the third integrated handle and roof rack assembly.

13. The vehicle as recited in claim 1, wherein the integrated handle and roof rack assembly is a single part that is configured to function as both a handle for installing or removing the removable roof panel and as a roof rack for storing cargo over top of the removable roof panel.

14. The vehicle as recited in claim 1, wherein the crossbar is received within a first slot of a handle portion of the integrated handle and roof rack assembly and is received within a second slot of a second handle portion of the second integrated handle and roof rack assembly.

15. The vehicle as recited in claim 1, wherein the removable roof panel is removable from a roof of the vehicle to provide an open air riding experience.

16. A method, comprising:
grasping an integrated handle and roof rack assembly of a removable roof panel;
installing the removable roof panel within a roof of a vehicle using the integrated handle and roof rack assembly; and
connecting a crossbar to the integrated handle and roof rack assembly, the crossbar and the integrated handle and roof rack assembly establishing a roof rack for storing cargo.

17. The method as recited in claim 16, wherein grasping the integrated handle and roof rack assembly includes grasping a shaft of a handle portion of the integrated handle and roof rack assembly.

18. The method as recited in claim 16, wherein connecting the crossbar includes inserting the crossbar into a slot formed in a handle portion of the integrated handle and roof rack assembly.

19. The method as recited in claim 16, wherein connecting the crossbar includes connecting the crossbar between the integrated handle and roof rack assembly and a second integrated handle and roof rack assembly of either the removable roof panel or a second removable roof panel.

20. The method as recited in claim 16, comprising:
automatically illuminating a portion of the integrated handle and roof rack assembly in response to correctly installing the removable roof panel within the roof.

21. The method as recited in claim 16, wherein connecting the crossbar to the integrated handle and roof rack assembly includes positioning the crossbar within a slot formed in a handle portion of the integrated handle and roof rack assembly.

22. The method as recited in claim 16, wherein the roof is an open air roof.

23. A vehicle, comprising:
a first removable roof panel that includes an interior surface and an exterior surface;
a first integrated handle and roof rack assembly mounted to the exterior surface of the first removable roof panel;
a second removable roof panel that includes an interior surface and an exterior surface;
a second integrated handle and roof rack assembly mounted to the exterior surface of the second removable roof panel; and
a crossbar extending from the first integrated handle and roof rack assembly to the second integrated handle and roof rack assembly,
wherein the crossbar is received within a first slot of a first handle portion of the first integrated handle and roof rack assembly and is received within a second slot of a second handle portion of the second integrated handle and roof rack assembly.

* * * * *